United States Patent
Oshima et al.

(10) Patent No.: US 7,792,495 B2
(45) Date of Patent: Sep. 7, 2010

(54) RADIO APPARATUS, TRANSMISSION CONTROL METHOD AND TRANSMISSION CONTROL PROGRAM

(75) Inventors: Yoshitaka Oshima, Hashima (JP); Toshinori Iinuma, Ogaki (JP)

(73) Assignee: Kyocera Corporation, Kyoto (JP)

( * ) Notice: Subject to any disclaimer, the term of this patent is extended or adjusted under 35 U.S.C. 154(b) by 544 days.

(21) Appl. No.: 11/667,773

(22) PCT Filed: Nov. 8, 2005

(86) PCT No.: PCT/JP2005/020426

§ 371 (c)(1),
(2), (4) Date: May 15, 2007

(87) PCT Pub. No.: WO2006/051771

PCT Pub. Date: May 18, 2006

(65) Prior Publication Data

US 2007/0298826 A1    Dec. 27, 2007

(30) Foreign Application Priority Data

Nov. 15, 2004   (JP) .............................. 2004-330731

(51) Int. Cl.
*H04B 7/00* (2006.01)
*H04B 7/02* (2006.01)
*H04B 7/06* (2006.01)

(52) U.S. Cl. ................ 455/69; 455/63.4; 455/522

(58) Field of Classification Search ............. 455/136, 455/138, 68, 69, 561, 130, 132
See application file for complete search history.

(56) References Cited

U.S. PATENT DOCUMENTS

2004/0014443 A1   1/2004   Nakao et al.

FOREIGN PATENT DOCUMENTS

| JP | 11-274976 | 10/1999 |
|---|---|---|
| JP | 2004-297575 | 10/2004 |
| JP | 2004297575 A | * 10/2004 |
| JP | 2004-165834 | 6/2004 |

(Continued)

OTHER PUBLICATIONS

Iinuma, T., et al., "An Adaptive Array Antenna PHS Base Station", Sanyo Technical Review, May 2000, pp. 80-88, vol. 32—No. 1, Sanyo Electric Co., Ltd., Japan.

(Continued)

*Primary Examiner*—Matthew D Anderson
*Assistant Examiner*—Gennadiy Tsvey
(74) *Attorney, Agent, or Firm*—Morrison & Foerster LLP (57) ABSTRACT

A radio apparatus, a transmission control method and a transmission control program are provided in which both of adaptive array processing and adaptive modulation are supported and a transmission directivity control scheme can be selected according to a modulation scheme. The radio apparatus includes a modulation unit modulating transmission data based on a selected modulation scheme, a transmission scheme selection unit selecting one of a first transmission weight for forming transmission directivity to direct a beam of a transmission radio wave in a direction of a desired radio apparatus and direct a null of a transmission radio wave in a direction of an interference wave and a second transmission weight for forming transmission directivity to maximize reception power at a desired radio apparatus, a transmission weight generation unit generating the selected transmission weight, and a transmission weight processing unit generating array transmission data having transmission directivity based on the modulated transmission data and the generated transmission weight.

4 Claims, 6 Drawing Sheets

FOREIGN PATENT DOCUMENTS

| | | |
|---|---|---|
| JP | 2000-106539 | 4/2000 |
| JP | 2000-151487 | 5/2000 |
| JP | 2003-298670 | 10/2003 |
| JP | 2004-153527 | 5/2004 |

OTHER PUBLICATIONS

Doi, Y., et al., "The Space Division Multiple Access PHS Base Station", Sanyo Technical Review, Dec. 2001, pp. 93-101, vol. 33—No. 3, Sanyo Electric Co., Ltd., Japan.

Sasaoka, H., "Mobile Communication (Idou Tsushin)", OHMSHA, May 1998, pp. 283-312, Japan. (In Japanese with Partial English Translation).

Taiwanese Office Action issued in Taiwanese Patent Application No. TW 94139857.

Japanese Office Action, with English translation, issued in Japanese Patent Application No. JP 2004-330731, mailed Jun. 19, 2007.

* cited by examiner

FIG.1

| CHARACTERISTIC OF EACH TRANSMISSION METHOD | | |
|---|---|---|
| TRANSMISSION METHOD | DESIRED WAVE POWER | INTERFERECE SUPPRESSING EFFECT |
| MMSE RECEPTION WEIGHT COPY | ○ | ◎ |
| ZERO FORCING METHOD | ○ | ○ |
| IN-PHASE COMBINATION MAXIMUM TRANSMISSION METHOD | ◎ | × |

FIG.2

| MODULATION SCHEME | DATA RATE | NOISE IMMUNITY |
|---|---|---|
| 16QAM | FAST | WEAK |
| 8PSK | ↓ | ↓ |
| $\pi/4$ SHIFT QPSK | | |
| BPSK | SLOW | STRONG |

| CODING RATE | ERROR CORRECTION ABILITY |
|---|---|
| LOW | HIGH |
| HIGH | LOW |

FIG.8

RADIO APPARATUS, TRANSMISSION CONTROL METHOD AND TRANSMISSION CONTROL PROGRAM

RELATED APPLICATIONS

This application is the U.S. National Phase under 35 U.S.C. §371 of International Application No. PCT/JP2005/020426, filed on Nov. 8, 2005, which in turn claims the benefit of Japanese Application No. 2004-330731, filed on Nov. 15, 2004, the disclosures of which Applications are incorporated by reference herein.

TECHNICAL FIELD

The present invention relates to a radio apparatus, a transmission control method and a transmission control program, and more particularly to a radio apparatus supporting a plurality of modulation schemes, a transmission control method and a transmission control program.

BACKGROUND ART

In a mobile communication system (for example, Personal Handy-Phone: PHS hereinafter), such a scheme is proposed in that a reception signal is extracted from a desired particular terminal by adaptive array processing in communications between a radio base apparatus (referred to as a base station hereinafter) and a mobile terminal apparatus (referred to as a terminal hereinafter), in particular, at a base station (see, for example, Toshinori Iinuma et al. "Adaptive Array Antenna PHS Base Station", SANYO TECHNICAL REVIEW, Sanyo Electric Co., Ltd., published on May 1, 2000, Vol. 32, No. 1, pp. 80-88 (Non-Patent Document 1), and Yoshiharu Doi et al. "The Space Division Multiple Access PHS Base Station" SANYO TECHNICAL REVIEW, Sanyo Electric Co., Ltd., published on Dec. 10, 2001, Vol. 33, No. 3, pp. 93-101 (Non-Patent Document 2)).

Adaptive array processing refers to a process of calculating a reception weight vector made of a reception coefficient (weight) for each antenna, based on a signal received from a terminal at an array antenna formed of a plurality of antennas of a base station, and weighting the received signal with the reception weight vector to accurately extract a signal from a particular user terminal.

An adaptive array base station employing such adaptive array processing is provided with a reception weight vector calculator calculating a reception weight vector for each symbol of a reception signal. The reception weight vector calculator performs a process of allowing a reception weight vector to converge in such a manner as to decrease the square of an error between the complex multiplication sum (array output signal) of the reception signal and the calculated reception weight vector and a known reference signal corresponding to a particular user terminal in a known reference signal segment (weight estimation segment) provided at the head of each frame of the reception signal.

In the adaptive array processing, such convergence of a reception weight vector is adaptively carried out according to variations in the propagation path characteristic of a radio signal, so that an interference component and noise are eliminated from a reception signal thereby extracting the reception signal from a particular user terminal.

Such a reception weight vector calculator uses Minimum Mean Square Error (MMSE) method to calculate a means square error between an array output signal and a reference signal and calculate a reception weight such that the error is minimized. Minimum Mean Square Error method includes a plurality of control algorithms including RLS (Recursive Least Squares) algorithm, LMS (Least Mean Square) algorithm, SMI (Sample Matrix Inversion) algorithm, and the like for use in a mobile communication system.

RLS algorithm, LMS algorithm and SMI algorithm are well-known techniques in the field of adaptive array processing.

At the adaptive array base station, additionally performed as a part of adaptive array processing is a process of deciding transmission directivity to a user terminal and transmission power by weighting a transmission signal with a transmission weight vector formed by copying the reception weight vector calculated by the reception weight vector calculator.

A signal transmitted using the same array antenna as in reception is weighted with the same user terminal as in reception being targeted, so that the adaptive array base station outputs a transmission signal having high directivity targeting only the same user terminal. In other words, a transmission weight is formed such that a beam of a transmission radio wave is directed in the direction of a desired user terminal and a null of a transmission radio wave is directed in the direction of an interfering user terminal. Here, a beam means a direction in which radio waves emitted from each antenna intensify each other and a null means a direction in which radio waves emitted from each antenna weaken each other. Therefore, the interfering radiation characteristic, which is the amount of interference applied by the transmission radio wave from a base station to the other surrounding base station (cell), can be suppressed.

A method of controlling directivity of a transmission signal by a transmission weight vector formed by copying a reception weight vector calculated by MMSE-type algorithm (referred to as MMSE reception weight copy method hereinafter) is known (see, for example, Hideichi Sasaoka, "Mobile Communication", Ohmsha, published on May 25, 1998, pp. 283-312 (Non-Patent Document 3)).

On the other hand, in stead of using a transmission weight vector formed by copying a reception weight vector as it is, a method of estimating a terminal arrival direction (a so-called reception response vector or simply a response vector) from a reception signal and estimating a transmission weight from the reception response vector (Zero-forcing method) is known (see, for example, Japanese Patent Laying-Open No. 2000-106539 (Patent Document 1)).

Here, a reception response vector represents information about the amplitude and phase of a signal from each terminal, of signal components from a terminal that is received at a base station. Such reception response vector of each terminal is estimated at a base station so that a propagation path characteristic in the radio area from each terminal to the base station, reception power and the like can be detected.

The method of estimating a reception response vector of a signal received from each terminal at a base station uses a technique of estimation by performing a complex multiplication of a reception signal (I signal and Q signal) received at each antenna of the base station and a re-modulation signal of known demodulation data corresponding to each terminal and obtaining the ensemble-average (time-average) of the result.

In the aforementioned Zero-forcing method, when a significant interference is measured, a reception response vector representing information of the arrival direction of a desired user terminal and an interfering user terminal is estimated, so that based on the estimated reception response vector, a transmission weight is formed such that a beam of a transmission radio wave is directed in the direction of the desired user terminal and a null of a transmission radio wave is directed in the direction of the interfering user terminal.

Accordingly, similarly to when a transmission weight is obtained by copying a reception weight, an adaptive array base station outputs a transmission signal having directivity targeting the desired user terminal, and in addition, the interfering radiation characteristic to other base stations (cells) can be suppressed.

As described above, at the adaptive array base station, an interference with a reception radio wave can be suppressed by the adaptive array processing and in addition, the interfering radiation characteristic to other base stations (cells) can be improved by transmission directivity control based on the above-noted MMSE reception weight copy method and Zero-forcing method, whereby the frequency usage efficiency can be improved in the mobile communication system as a whole.

However, although the transmission directivity control such as MMSE reception weight copy method and Zero-forcing method can be used to suppress the interfering radiation characteristic, which is the amount of interference applied by a transmission radio wave of the base station to other surrounding base stations (cells), the optimum transmission does not always result in view of the communication quality for the desired user terminal itself.

For example, in the adaptive array reception using the above-noted MMSE-type algorithm, a reception weight is generated such that a signal-to-noise ratio is maximized. Therefore, for example when a power difference is big in a desired wave component in a reception signal at each antenna included in an array antenna, a reception weight for each antenna widely varies.

Then, if the widely-varied reception weight is applied as it is as a transmission weight, the transmission power of an antenna of a part of the array antenna significantly reduces, resulting in that radio waves can actually be transmitted only from the remaining part of antennas of the array antenna. In such a case, the transmission power of the entire array antenna significantly reduces.

More specifically, although directivity for a desired user terminal is formed, reception power in the desired user terminal may be reduced when a communication environment considerably changes such that a new interference wave occurs before a reception weight is generated and reflected in a transmission signal. In other words, reception power at a desired user terminal cannot always be maximized.

Therefore, in MMSE reception weight copy method and Zero-forcing method, the transmission power level at a base station is insufficient, so that the communication quality at the desired user terminal may be degraded.

On the other hand, a technique of in-phase combination (referred to as the in-phase combination maximum transmission method) is known in which such a transmission weight is calculated that allows a reception power level at a desired user terminal to be maximized (see, for example, Japanese Patent Laying-Open No. 11-274976 (Patent Document 2) and Japanese Patent Laying-Open No. 2000-151487 (Patent Document 3)).

The basic principle of the in-phase combination will be described briefly. In the in-phase combination maximum transmission method, a phase of a transmission weight is determined based on a phase of a reception response vector of each antenna such that a reception power at a terminal in the terminal arrival direction (reception response vector) estimated by the adaptive array processing is maximum. More specifically, a transmission weight is generated such that the multiplication result in each antenna is only a real number by multiplying a reception response vector for each antenna included in an array antenna by a transmission weight corresponding to each antenna. Accordingly, the desired user terminal can receive each transmission signal in phase from the array antenna of the base station, and the reception power at the desired user terminal can be maximized. It is noted that the amplitude of the reception response vector becomes the amplitude of the transmission weight as it is.

As described above, since the schemes of transmission directivity control at the adaptive array base station are different in interfering radiation characteristics and reception power characteristics at a desired user terminal, there has conventionally been proposed a scheme of selecting each transmission directivity control scheme according to a communication environment rather than supporting only one of the transmission directivity control schemes (see, for example, Japanese Patent Laying-Open No. 2004-153527 (Patent Document 4)).

On the other hand, PHS additionally employs a modulation scheme with a number of levels larger than the initially employed π/4 shift QPSK (Quadrature Phase Shift Keying) modulation scheme in order to support data communications which require a bulk transmission as compared with the conventional voice communications. As an example of such a multilevel modulation scheme, 16QAM (Quadrature Amplitude Modulation) modulation scheme or the like is known.

In the modulation scheme with a large number of levels such as 16QAM modulation scheme, an interval between symbols is narrow and symbols are densely arranged, so that it is likely that a symbol is erroneously recognized in the case of a bad communication environment, and a reception error tends to occur, although the data rate is high as compared with π/4 shift QPSK modulation scheme.

Moreover, BPSK modulation scheme is advantageous in that a reception error is less likely to occur since the noise immunity is high, although the data rate is low as compared with π/4 shift QPSK modulation scheme and 16QAM modulation scheme.

In this way, since the modulation schemes are different in data rate and noise immunity, an adaptive modulation scheme has conventionally been proposed in which a terminal and a base station select each modulation scheme according to a communication environment rather than supporting only one of the modulation schemes (see, for example, Japanese Patent Laying-Open No. 2003-298670 (Patent Document 5)).

Patent Document 1: Japanese Patent Laying-Open No. 2000-106539

Patent Document 2: Japanese Patent Laying-Open No. 11-274976

Patent Document 3: Japanese Patent Laying-Open No. 2000-151487

Patent Document 4: Japanese Patent Laying-Open No. 2004-153527

Patent Document 5: Japanese Patent Laying-Open No. 2003-298670

Non-Patent Document 1: Toshinori Iinuma et al. "Adaptive Array Antenna PHS Base Station", SANYO TECHNICAL REVIEW, Sanyo Electric Co., Ltd., published on May 1, 2000, Vol. 32, No. 1, pp. 80-88

Non-Patent Document 2: Yoshiharu Doi et al. "The Space Division Multiple Access PHS Base Station" SANYO TECHNICAL REVIEW, Sanyo Electric Co., Ltd., published on Dec. 10, 2001, Vol. 33, No. 3, pp. 93-101

Non-Patent Document 3: Hideichi Sasaoka, "Mobile Communication", Ohmsha, published on May 25, 1998, pp. 283-312

DISCLOSURE OF THE INVENTION

Problems to be Solved by the Invention

However, the radio apparatus disclosed in Japanese Patent Laying-Open No. 2004-153527 (Patent Document 4) and Japanese Patent Laying-Open No. 2003-298670 (Patent Document 5) is configured to support only one of the adaptive array processing and the adaptive modulation and is not configured to support both of the adaptive array processing and the adaptive modulation.

Furthermore, with the configuration in which the radio apparatuses disclosed in Japanese Patent Laying-Open No. 2004-153527 (Patent Document 4) and Japanese Patent Laying-Open No. 2003-298670 (Patent Document 5) are merely combined, it is impossible to properly select a transmission directivity control scheme according to a modulation scheme.

More specifically, it is improper to select MMSE reception weight copy method or Zero-forcing method when 16QAM modulation scheme is selected. This is because 16QAM modulation scheme is weak in noise immunity, and therefore the communication quality at a desired user terminal is significantly degraded if the transmission power for the desired user terminal becomes insufficient due to variations in the radio wave environment when MMSE reception weight copy method or Zero-forcing method is selected.

Moreover, it is improper to select the in-phase combination maximum transmission method when BPSK modulation scheme is selected. This is because BPSK modulation scheme is strong in noise immunity, and therefore it is less effective to select the in-phase combination maximum transmission method to maximize reception power at a desired user terminal. On the contrary, the interfering radiation characteristic to other base stations (cells) becomes worse.

Therefore, an object of the present invention is to provide a radio apparatus, a transmission control method and a transmission control program supporting both the adaptive array processing and the adaptive modulation and being capable of properly selecting a transmission directivity control scheme according to a modulation scheme.

Means for Solving the Problems

In order to solve the aforementioned problems, in accordance with an aspect of the present invention, a radio apparatus receiving and transmitting a signal using a plurality of antennas includes: an adaptive array reception processing unit performing a reception process on a reception signal received by the plurality of antennas by adaptive array processing; a reception response vector generation unit generating a reception response vector based on the reception signal received by the plurality of antennas; a modulation scheme selection unit selecting a modulation scheme; a modulation unit modulating transmission data based on the selected modulation scheme; a transmission scheme selection unit selecting one of a first transmission weight for forming transmission directivity to direct a beam of a transmission radio wave in a direction of desired another radio apparatus and direct a null of a transmission radio wave in a direction of an interference wave and a second transmission weight for forming transmission directivity to maximize reception power at desired another radio apparatus, based on the selected modulation scheme; a transmission weight generation unit generating the first transmission weight based on a reception process result from the adaptive array reception processing unit or the reception response vector if the first transmission weight is selected, and generating the second transmission weight based on the reception response vector if the second transmission weight is selected; a transmission weight processing unit generating array transmission data having the transmission directivity, based on the modulated transmission data and the generated transmission weight; and a transmission unit converting the array transmission data into a transmission signal.

Preferably, the transmission scheme selection unit selects the first transmission weight if a number of levels of the selected modulation scheme is less than a prescribed value, and selects the second transmission weight if a number of levels of the selected modulation scheme is equal to or more than the prescribed value.

Preferably, the radio apparatus further includes an error correction coding unit performing an error correction coding process on the transmission data. The modulation unit modulates the transmission data subjected to the error correction coding process based on the selected modulation scheme. The transmission scheme selection unit selects one of the first transmission weight and the second transmission weight, based on a coding rate of the error correction coding process and a modulation scheme selected by the modulation scheme selection unit.

More preferably, the transmission scheme selection unit selects the first transmission weight if the coding rate is less than a prescribed coding rate or if the coding rate is equal to or more than the prescribed coding rate and a number of levels of the selected modulation scheme is less than a prescribed number of levels, and selects the second transmission weight if the coding rate is equal to or more than the prescribed coding rate and if a number of levels of the selected modulation scheme is equal to or more than the prescribed number of levels.

In order to solve the aforementioned problems, in accordance with an aspect of the present invention, a transmission control method in a radio apparatus receiving and transmitting a signal using a plurality of antennas includes: an adaptive array reception processing step of performing a reception process on a reception signal received by the plurality of antennas by adaptive array processing; a reception response vector generation step of generating a reception response vector based on the reception signal received by the plurality of antennas; a modulation scheme selection step of selecting a modulation scheme; a modulation step of modulating transmission data based on the selected modulation scheme; a transmission scheme selection step of selecting one of a first transmission weight for forming transmission directivity to direct a beam of a transmission radio wave in a direction of desired another radio apparatus and direct a null of a transmission radio wave in a direction of an interference wave and a second transmission weight for forming transmission directivity to maximize reception power at desired another radio apparatus, based on the selected modulation scheme; a transmission weight generation step of generating the first transmission weight based on a reception process result at the adaptive array reception processing step or the reception response vector if the first transmission weight is selected, and generating the second transmission weight based on the reception response vector if the second transmission weight is selected; and a transmission weight processing step of generating array transmission data having the transmission directivity, based on the modulated transmission data and the generated transmission weight.

Preferably, at the transmission scheme selection step, the first transmission weight is selected if a number of levels of the selected modulation scheme is less than a prescribed value, and the second transmission weight is selected if a number of levels of the selected modulation scheme is equal to or more than the prescribed value.

Preferably, the transmission control method further includes an error correction coding step of performing an error correction coding process on the transmission data. At the modulation step, the transmission data subjected to the error correction coding process is modulated based on the selected modulation scheme. At the transmission scheme selection step, one of the first transmission weight and the second transmission weight is selected based on a coding rate of the error correction coding process and a modulation scheme selected at the modulation scheme selection step.

More preferably, at the transmission scheme selection step, the first transmission weight is selected if the coding rate is less than a prescribed coding rate or if the coding rate is equal to or more than the prescribed coding rate and a number of levels of the selected modulation scheme is less than a prescribed number of levels, and the second transmission weight is selected if the coding rate is equal to or more than the prescribed coding rate and if a number of levels of the selected modulation scheme is equal to or more than the prescribed number of levels.

In order to solve the aforementioned problem, in accordance with an aspect of the present invention, a transmission control program in a radio apparatus receiving and transmitting a signal using a plurality of antennas causes a computer to perform: an adaptive array reception processing step of performing a reception process on a reception signal received by the plurality of antennas by adaptive array processing; a reception response vector generation step of generating a reception response vector based on the reception signal received by the plurality of antennas; a modulation scheme selection step of selecting a modulation scheme; a modulation step of modulating transmission data based on the selected modulation scheme; a transmission scheme selection step of selecting one of a first transmission weight for forming transmission directivity to direct a beam of a transmission radio wave in a direction of desired another radio apparatus and direct a null of a transmission radio wave in a direction of an interference wave and a second transmission weight for forming transmission directivity to maximize reception power at desired another radio apparatus, based on the selected modulation scheme; a transmission weight generation step of generating the first transmission weight based on a reception process result at the adaptive array reception processing step or the reception response vector if the first transmission weight is selected, and generating the second transmission weight based on the reception response vector if the second transmission weight is selected; and a transmission weight processing step of generating array transmission data having the transmission directivity, based on the modulated transmission data and the generated transmission weight.

Preferably, at the transmission scheme selection step, the first transmission weight is selected if a number of levels of the selected modulation scheme is less than a prescribed value, and the second transmission weight is selected if a number of levels of the selected modulation scheme is equal to or more than the prescribed value.

Preferably, the transmission control program further causes a computer to perform an error correction coding step of performing an error correction coding process on the transmission data. At the modulation step, the transmission data subjected to the error correction coding process is modulated based on the selected modulation scheme. At the transmission scheme selection step, one of the first transmission weight and the second transmission weight is selected based on a coding rate of the error correction coding process and a modulation scheme selected at the modulation scheme selection step.

More preferably, at the transmission scheme selection step, the first transmission weight is selected if the coding rate is less than a prescribed coding rate or if the coding rate is equal to or more than the prescribed coding rate and a number of levels of the selected modulation scheme is less than a prescribed number of levels, and the second transmission weight is selected if the coding rate is equal to or more than the prescribed coding rate and if a number of levels of the selected modulation scheme is equal to or more than the prescribed number of levels.

EFFECTS OF THE INVENTION

In accordance with the present invention, it is possible to support both the adaptive array processing and the adaptive modulation and to properly select a transmission directivity control scheme according to a modulation scheme.

DESCRIPTION OF THE REFERENCE SIGNS 1A-1D antenna, 2A-2D switch, 3A-3D reception unit, 4A-4D multiplier, 5 adder, 6 reception weight generation unit, 7 reception weight setting unit, 8 reference signal memory, 9 reception response vector generation unit, 10 modulation scheme selection unit, 11 transmission scheme selection unit, 12 in-phase combination transmission weight generation unit, 13 MMSE transmission weight generation unit, 14 modulation unit, 15 transmission weight setting unit, 16A-16D multiplier, 17A-17D transmission unit, 18 error correction control unit, 19 error correction coding unit, 101 adaptive array reception processing unit, 102 transmission weight generation unit, 103 transmission weight processing unit.

BEST MODES FOR CARRYING OUT THE INVENTION

In the following, the embodiments of the present invention will be described in detail with reference to the figures. It is noted that in the figure the same or corresponding parts will be denoted with the same reference characters and description thereof will not be repeated.

First Embodiment

Figure 1:
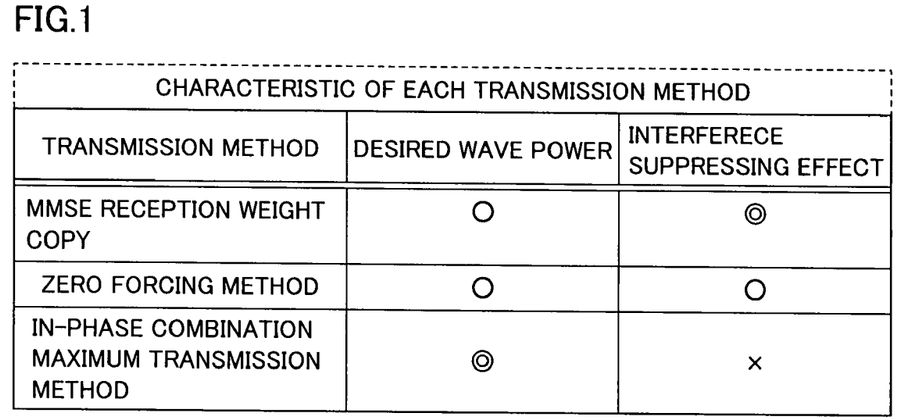
FIG. 1 is a diagram showing the characteristics of transmission directivity control methods in contrast with one another.

FIG. 1 is a diagram showing the characteristics of three kinds of transmission directivity control methods described in the background art in contrast with one another.

Referring to the figure, in MMSE reception weight copy method, reception power (desired wave power) at a desired user terminal is not always at a maximum level (white circle). On the other hand, in this method, a reception weight is used as it is as a transmission weight, so that a null is directed to an interference wave mixed into a reception signal. Thus, the interference suppressing effect is increased (double circle).

Next, in Zero-forcing method, reception power (desired wave power) at a desired user terminal is not always at the maximum level (white circle). On the other hand, in this method, a beam and a null are directed to the desired user terminal and the interfering user terminal that can be captured (of which reception response vector can be estimated), respectively. Of the interference waves mixed into a reception signal, the interference suppressing effect can be achieved for the interfering user that can be captured, while the interference suppressing effect cannot be achieved for the interfering user that cannot be captured (white circle).

In contrast with these two kinds of method, in the in-phase combination maximum transmission method, reception power (desired wave power) in a desired user terminal is improved and maximized (double circle). On the other hand, in this transmission method, the transmission directivity to the other base station (cell) is unlimited, so that the interference suppressing effect cannot be achieved (X-mark).

Figure 2:
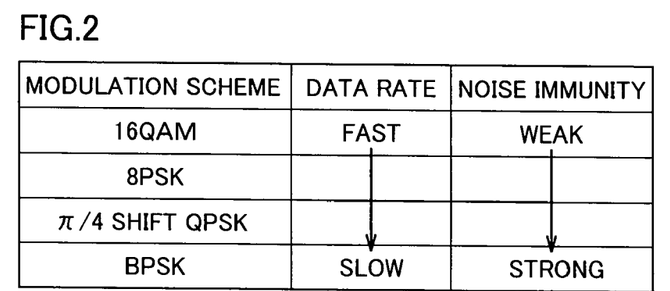
FIG. 2 is a diagram showing the characteristics of modulation schemes in contrast with one another.

FIG. 2 is a diagram showing the characteristics of the modulation schemes in contrast with each other.

Referring to the figure, of the modulation schemes, 16QAM modulation scheme provides the highest data rate and BPSK modulation scheme provides the lowest data rate. This is because the number of levels in 16QAM modulation scheme is 16, which is the highest, and the number of levels in BPSK modulation scheme is 2, which is the lowest. Thus, the amount of information that can be transmitted in one symbol is maximum in 16QAM modulation scheme and it is minimum in BPSK modulation scheme. Furthermore, of the modulation schemes, 16QAM modulation scheme provides the lowest noise immunity while BPSK modulation scheme provides the highest noise immunity. This is because the interval between symbols is narrowest in 16QAM modulation scheme and it is widest in BPSK modulation scheme.

Noting those characteristics of each transmission directivity control method and each modulation scheme, the present invention allows a transmission directivity control scheme to be selected properly according to a modulation scheme.

Figure 3:
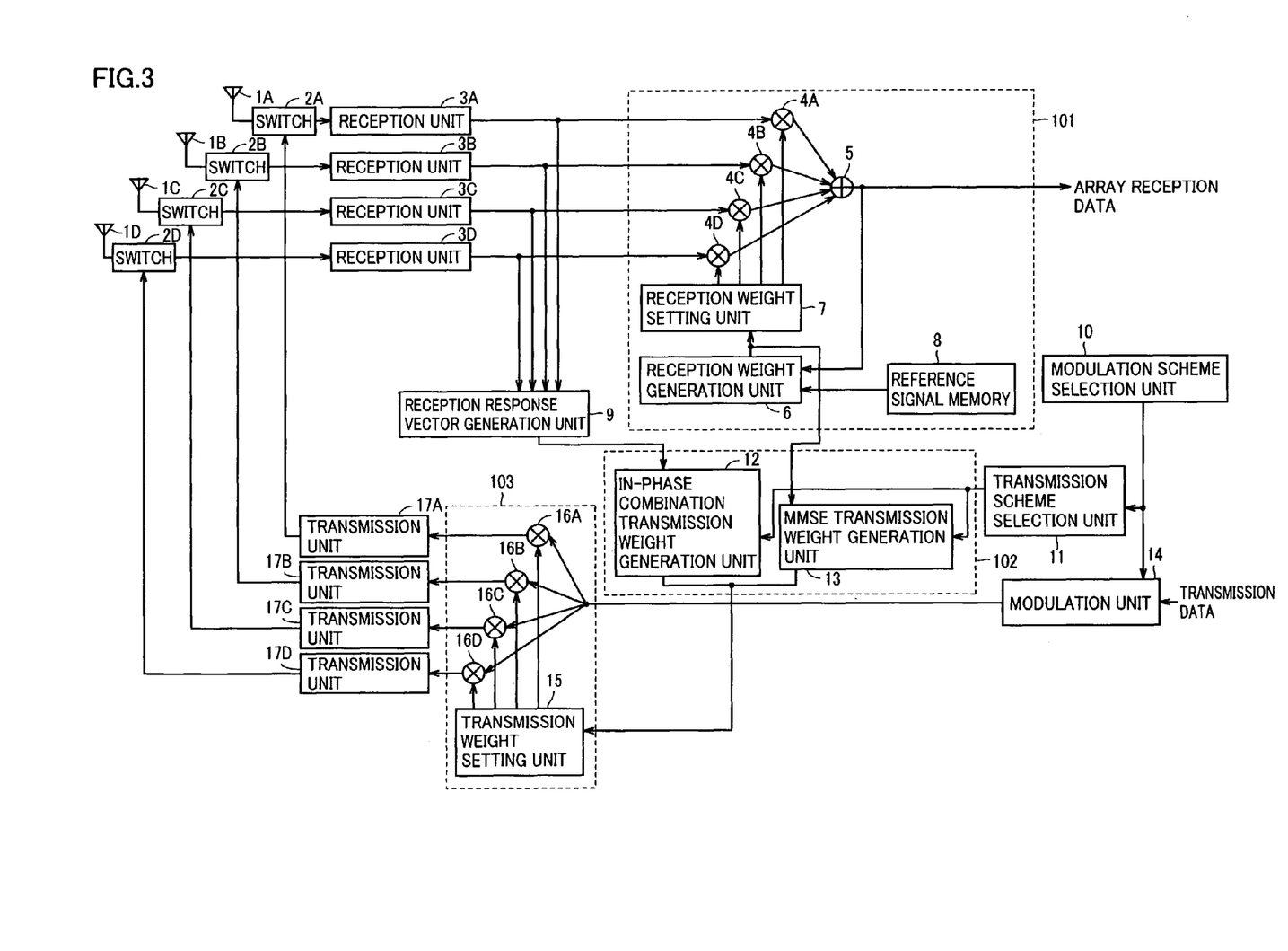
FIG. 3 is a functional block diagram showing a configuration of an adaptive array base station in accordance with a first embodiment.

FIG. 3 is a functional block diagram showing a configuration of an adaptive array base station in accordance with the first embodiment of the present invention.

[Configuration and Basic Operation]

Referring to the figure, an adaptive array base station includes an antenna 1A-an antenna 1D, a switch 2A-a switch 2D, a reception unit 3A-a reception unit 3D, an adaptive array reception processing unit 101, a reception response vector generation unit 9, a modulation scheme selection unit 10, a transmission scheme selection unit 11, a transmission weight generation unit 102, a modulation unit 14, a transmission weight processing unit 103, and a transmission unit 17A-a transmission unit 17D.

Adaptive array reception processing unit 101 includes a multiplier 4A-a multiplier 4D, an adder 5, a reception weight generation unit 6, a reception weight setting unit 7, and a reference signal memory 8.

Transmission weight generation unit 102 includes an in-phase combination transmission weight generation unit 12 and an MMSE transmission weight generation unit 13.

Transmission weight processing unit 103 includes a transmission weight setting unit 15 and a multiplier 16A-a multiplier 16D.

Antenna 1A-antenna 1D receive a transmission radio wave from a terminal for output as a reception signal to switch 2A-switch 2D. In addition, antenna 1A-antenna 1D transmit a transmission signal received from switch 2A-switch 2D as a transmission radio wave to a terminal.

Switch 2A-switch 2D switch between sending reception signals received from antenna 1A-antenna 1D to reception unit 3A-reception unit 3D and sending transmission signals received from transmission unit 17A-transmission unit 17D to antenna 1A-antenna 1D according to a not-shown control signal.

Reception unit 3A-reception unit 3D converts in frequency a reception signal in RF (Radio Frequency) band received from switch 2A-switch 2D to a base band signal and converts the base band signal which is an analog signal into reception data which is a digital signal, for output to multiplier 4A-multiplier 4D and reception response vector generation unit 9.

Reception weight generation unit 6 performs a process similar to that of the reception weight vector calculator as described above by comparing that part of the array reception signal received from adder 5 which corresponds to a reference signal with the reference signal obtained from reference signal memory 8 and outputs the generated reception weight for each antenna to reception weight setting unit 7 and MMSE transmission weight generation unit 13.

Reception weight setting unit 7 outputs the reception weight for each antenna received from reception weight generation unit 6 to multiplier 4A-multiplier 4D.

Multiplier 4A-multiplier 4D perform a complex multiplication of the reception data received from reception unit 3A-reception unit 3D with the reception weight received from reception weight setting unit 7 and outputs the multiplication result to adder 5.

Adder 5 adds up the multiplication results received from multiplier 4A-multiplier 4D and outputs array reception data, which is the addition result, to reception weight generation unit 6 and an external circuit.

Reception response vector generation unit 9 generates the above-noted reception response vector based on the reception data received from reception unit 3A-reception unit 3D for output to in-phase combination transmission weight generation unit 12.

Modulation scheme selection unit 10 selects a modulation scheme for transmission data to be transmitted to a desired user terminal, for example, according to the state of communication with a desired user terminal and the service type such as voice communication and data communication used by a desired user terminal, and outputs modulation scheme information representing the selected modulation scheme to modulation unit 14 and transmission scheme selection unit 11.

Modulation unit 14 modulates the transmission data based on the modulation scheme information received from modulation scheme selection unit 10 for output as modulation data to multiplier 16A-multiplier 16D.

Transmission scheme selection unit 11 selects one of in-phase combination transmission weight generation unit 12 and MMSE transmission weight generation unit 13 based on the modulation scheme information received from modulation scheme selection unit 10 to output a transmission weight generation instruction to the selected transmission weight generation unit.

Upon reception of the transmission weight generation instruction from transmission scheme selection unit 11, in-phase combination transmission weight generation unit 12 generates a transmission weight for each antenna by the aforementioned in-phase combination maximum transmission method, based on the reception response vector received from reception response vector generation unit 9, for output to transmission weight setting unit 15.

Upon reception of the transmission weight generation instruction from transmission scheme selection unit 11, MMSE transmission weight generation unit 13 generates a transmission weight for each antenna by the aforementioned MMSE reception weight copy method, based on the reception weight for each antenna received from reception weight generation unit 6, which is the reception processing result from adaptive array reception processing unit 101, for output to transmission weight setting unit 15.

Transmission weight setting unit 15 outputs the transmission weight for each antenna received from in-phase combination transmission weight generation unit 12 or MMSE transmission weight generation unit 13 to multiplier 16A-multiplier 16D.

Multiplier 16A-multiplier 16D multiply the modulation data received from modulation unit 14 by the transmission weight for each antenna received from transmission weight setting unit 15 to generate array transmission data having transmission directivity based on MMSE reception weight copy method or the in-phase combination maximum transmission method, for output to transmission unit 17A-transmission unit 17D.

Transmission unit 17A-transmission unit 17D convert the array transmission data, which is a digital signal, received from multiplier 16A-multiplier 16D into an analog signal and converts in frequency the converted analog signal to a transmission signal in RF band for output to switch 2A-switch 2D.

[Operation]

Now, an operation of the adaptive array base station in accordance with the present embodiment selecting a transmission directivity control scheme will be described with reference to the figure.

Figure 4:
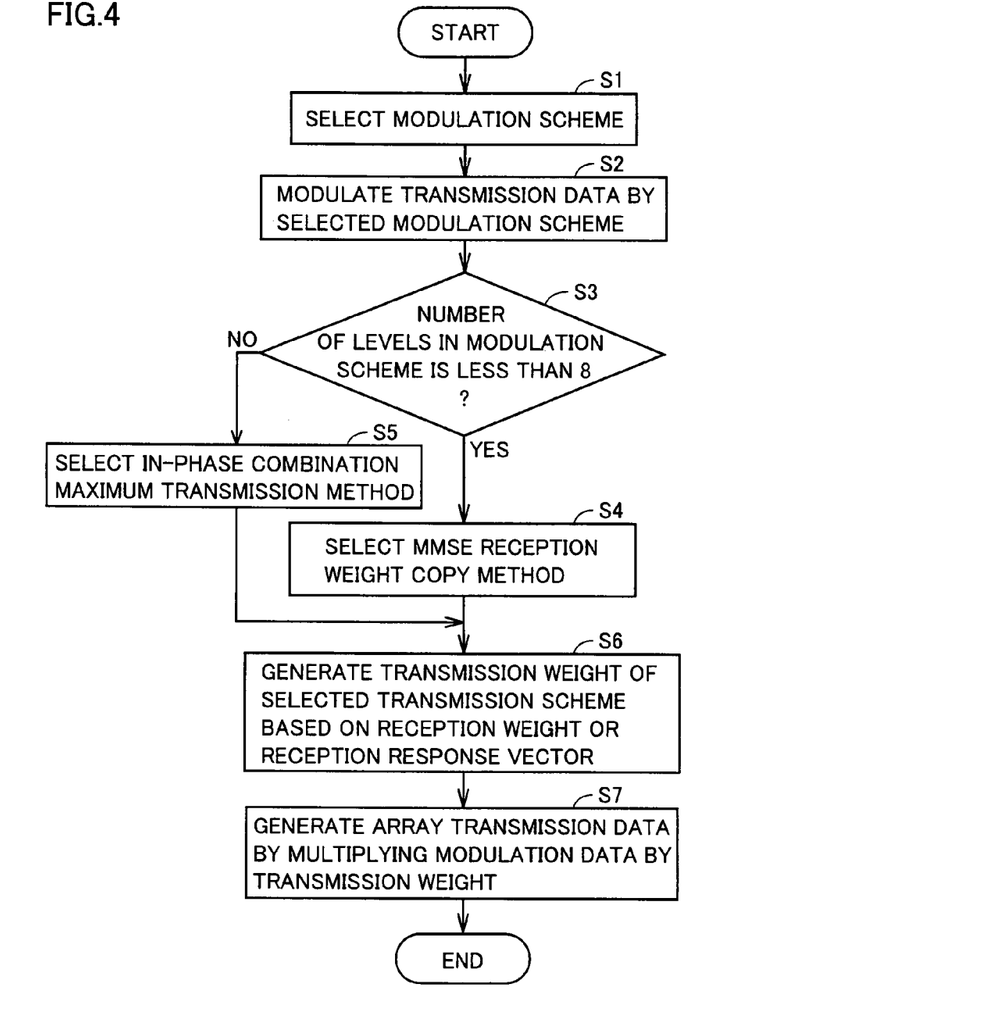
FIG. 4 is a flowchart defining an operation procedure of the adaptive array base station in accordance with the first embodiment.

FIG. 4 is a flowchart defining an operation procedure of the adaptive array base station in accordance with the present embodiment. Adaptive array reception processing unit 101, transmission weight generation unit 102, reception response vector generation unit 9, modulation scheme selection unit 10, modulation unit 14, transmission scheme selection unit 11, and transmission weight processing unit 103 read a program including each step of the flowchart from a not-shown memory for execution. This program can be installed from an external source.

Modulation scheme selection unit 10 selects a modulation scheme for transmission data to be transmitted to a desired user terminal, for example, according to the state of communication with a desired user terminal and the service type such as voice communication and data communication used by a desired user terminal and outputs modulation scheme information representing the selected modulation scheme to modulation unit 14 and transmission scheme selection unit 11 (step S1).

Modulation unit 14 modulates transmission data based on the modulation scheme information received from modulation scheme selection unit 10 for output as modulation data to multiplier 16A-multiplier 16D (step S2).

If the number of levels of the modulation scheme represented by the modulation scheme information received from modulation scheme selection unit 10 is less than 8 (YES at step S3), transmission scheme selection unit 11 outputs a transmission weight generation instruction to MMSE transmission weight generation unit 13 (step S4). On the other hand, if the number of levels of the modulation scheme represented by the modulation scheme information received from modulation scheme selection unit 10 is equal to or more than 8 (NO at step S3), transmission scheme selection unit 11 outputs a transmission weight generation instruction to in-phase combination transmission weight generation unit 12.

Figure 5:
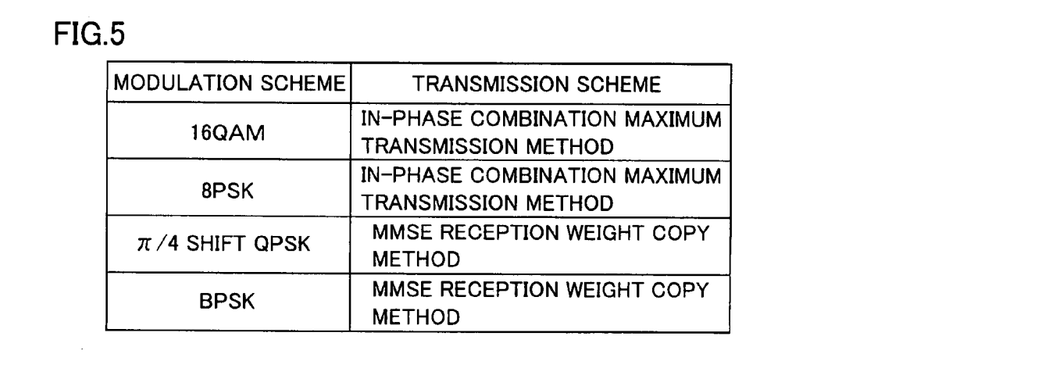
FIG. 5 is a diagram showing the relation between the modulation scheme and the transmission directivity control scheme selected by the adaptive array base station in accordance with the first embodiment.

Here, FIG. 5 shows the relation between the modulation schemes and the transmission directivity control schemes selected by the adaptive array base station in accordance with the present embodiment.

Referring to the figure, if $\pi/4$ shift QPSK modulation scheme (the number of levels is 4) and BPSK modulation scheme (the number of levels is 2) are selected where the number of levels of the modulation scheme is less than 8, transmission scheme selection unit 11 outputs a transmission weight generation instruction to MMSE transmission weight generation unit 13 which performs MMSE reception weight copy method (step S4). On the other hand, if 8PSK modulation scheme (the number of levels is 8) and 16QAM modulation scheme (the number of levels is 16) are selected where the number of levels of the modulation scheme is equal to or more than 8, transmission scheme selection unit 11 outputs a transmission weight generation instruction to in-phase combination transmission weight generation unit 12 which performs the in-phase combination maximum transmission method (step S5).

Referring to FIG. 4 again, upon reception of the transmission weight generation instruction from transmission scheme selection unit 11, MMSE transmission weight generation unit 13 generates a transmission weight for each antenna by the aforementioned MMSE reception weight copy method, based on the reception weight for each antenna received from reception weight generation unit 6, which is a reception processing result from adaptive array reception processing unit 101, for output to transmission weight setting unit 15 (step S6).

Upon reception of the transmission weight generation instruction from transmission scheme selection unit 11, in-phase combination transmission weight generation unit 12 generates a transmission weight for each antenna by the aforementioned in-phase combination maximum transmission method, based on the reception response vector received from reception response vector generation unit 9, for output to transmission weight setting unit 15 (step S6).

Transmission weight setting unit 15 outputs the transmission weight for each antenna received from in-phase combination transmission weight generation unit 12 or MMSE transmission weight generation unit 13 to multiplier 16A-multiplier 16D (step S7).

Multiplier 16A-multiplier 16D multiply the modulation data received from modulation unit 14 by the transmission weight for each antenna received from transmission weight setting unit 15 to generate array transmission data having transmission directivity based on MMSE reception weight copy method or the in-phase combination maximum transmission method for output to transmission unit 17A-transmission unit 17D (step S7).

Unfortunately, the radio apparatus disclosed in Japanese Patent Laying-Open No. 2004-153527 (Patent Document 4)

and Japanese Patent Laying-Open No. 2003-298670 (Patent Document 5) cannot support both of the adaptive array processing and the adaptive modulation and select a transmission directivity control scheme properly according to a modulation scheme.

However, in the adaptive array base station in accordance with the present embodiment, if a modulation scheme with the number of levels less than 8, that is, high noise immunity is selected, MMSE reception weight copy method is selected which has the effect of suppressing the interfering radiation characteristic to other base stations (cells). Then, if a modulation scheme with the number of levels equal to or more than 8, that is, low noise immunity is selected, the in-phase combination maximum transmission method is selected which has the effect of maximizing the reception power at a desired user terminal. Therefore, the adaptive array base station in accordance with the present embodiment can support both of the adaptive array processing and the adaptive modulation and select a transmission directivity control scheme properly according to a modulation scheme.

Second Embodiment

Figure 6:
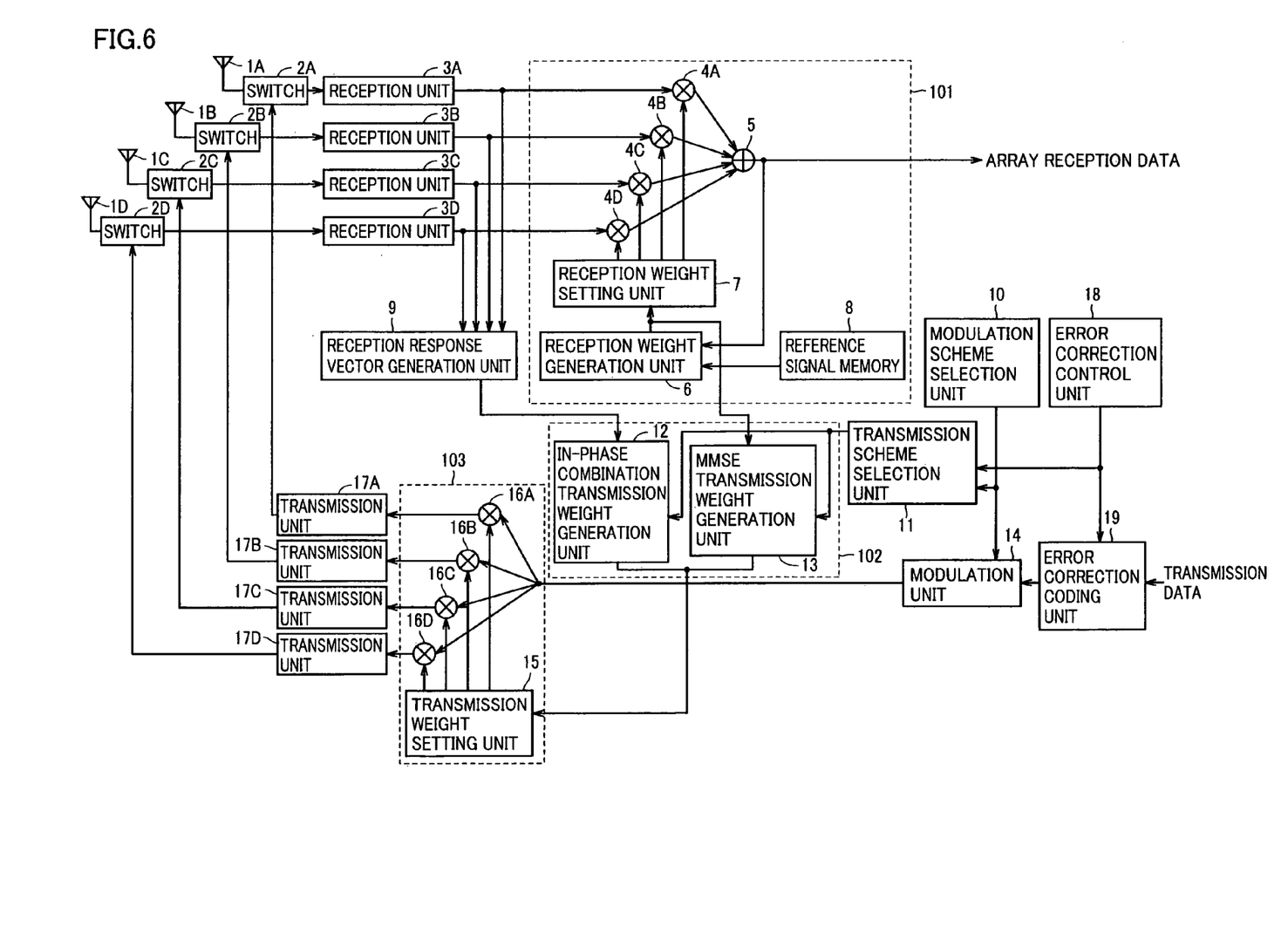
FIG. 6 is a functional block diagram showing a configuration of an adaptive array base station in accordance with a second embodiment.

FIG. 6 is a functional block diagram showing a configuration of an adaptive array base station in accordance with a second embodiment of the present invention.

[Configuration and Basic Operation]

Referring to the figure, an adaptive array base station in accordance with the present embodiment further includes an error correction control unit 18 and an error correction coding unit 19 for the adaptive array base station in accordance with the first embodiment.

Error correction control unit 18 decides a coding rate of a convolution code which is a kind of an error correction code, for example, according to the state of communication with a desired user terminal and the service type such as voice communication and data communication used by a desired user terminal and outputs error correction control information representing the decided coding rate to error correction coding unit 19 and transmission scheme selection unit 11.

Error correction coding unit 19 performs an error correction coding process on transmission data to generate a convolution code with a coding rate represented by the error correction control information received from error correction control unit 18 and outputs the transmission data subjected to the error correction coding process to modulation unit 14.

Here, a coding rate is a ratio of the length of information bits to the length of coded bits (information bit+redundancy bit). For example, a convolution code with coding rate ¾ is a code provided with a error correction ability by converting three bits of information into four bits of coded bits.

Figure 7:
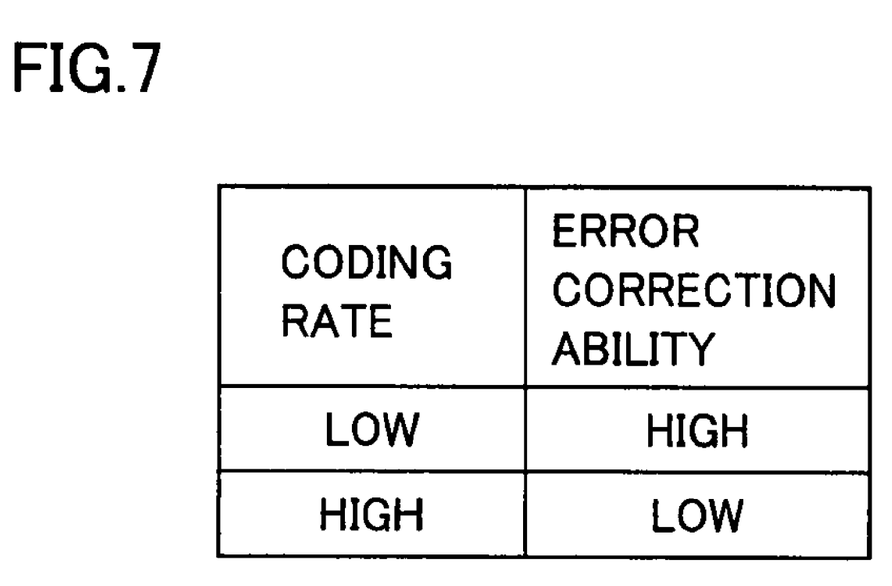
FIG. 7 is a diagram showing the relation between a coding rate and an error correction ability.

FIG. 7 shows the relation between the coding rate and the error correction ability. Referring to the figure, the lower the coding rate is, the higher the error correction ability is, and the higher the coding rate is, the lower the error correction ability is. It is noted that with the smaller coding rate, the error correction ability becomes higher but the error correction coding process generally becomes complicated.

Transmission scheme selection unit 11 selects one of in-phase combination transmission weight generation unit 12 and MMSE transmission weight generation unit 13, based on the coding rate represented by the error correction control information received from error correction control unit 18 and the modulation scheme information received from modulation scheme selection unit 10, and outputs a transmission weight generation instruction to the selected transmission weight generation unit.

The other configuration and basic operation is similar to that of the adaptive array base station in accordance with the first embodiment.

[Operation]

Next, the operation of the adaptive array base station in accordance with the present embodiment selecting a transmission directivity control scheme will be described with reference to the drawing.

Figure 8:
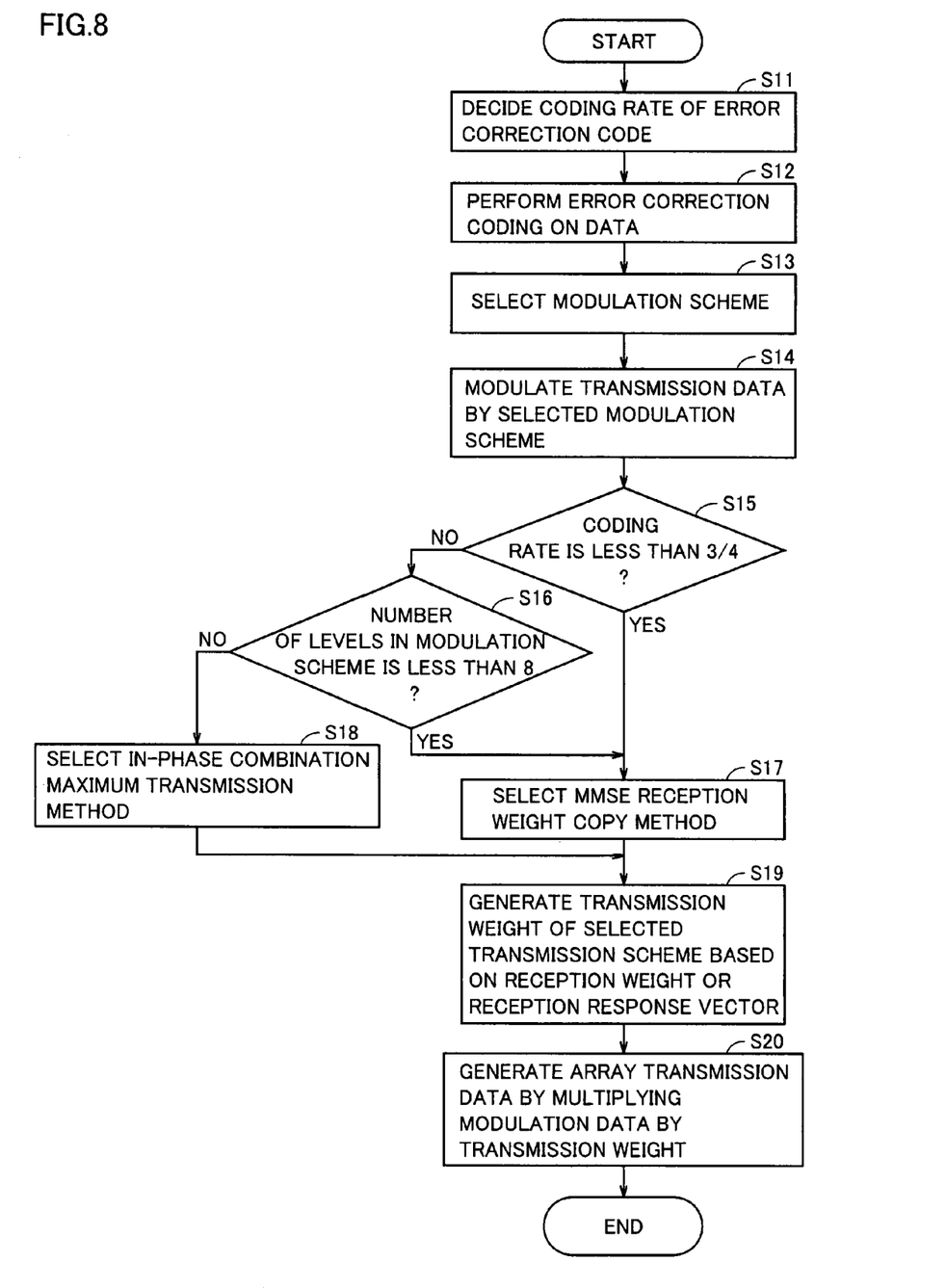
FIG. 8 is a flowchart defining an operation procedure of the adaptive array base station in accordance with the second embodiment.

FIG. 8 is a flowchart defining an operation procedure of the adaptive array base station in accordance with the present embodiment. Error correction control unit 18, error correction coding unit 19, adaptive array reception processing unit 101, transmission weight generation unit 102, reception response vector generation unit 9, modulation scheme selection unit 10, modulation unit 14, transmission scheme selection unit 11, and transmission weight processing unit 103 read a program including each step of the flowchart from a not-shown memory for execution. This program may be installed from an external source.

Error correction control unit 18 decides a coding rate of a convolution code which is a kind of error correction code, for example, according to the state of communication with a desired user terminal and the service type such as voice communication and data communication used by a desired user terminal, and outputs error correction control information representing the decided coding rate to error correction coding unit 19 and transmission scheme selection unit 11 (step S11).

Error correction coding unit 19 performs an error correction coding process on transmission data to generate a convolution code with a coding rate represented by the error correction control information received from error correction control unit 18 and outputs the transmission data subjected to the error correction coding process to modulation unit 14 (step S12).

Modulation scheme selection unit 10 selects a modulation scheme for the transmission data to be transmitted to a desired user terminal, for example, according to the state of communication with a desired user terminal and the service type such as voice communication and data communication used by a desired user terminal, and outputs modulation scheme information representing the selected modulation scheme to modulation unit 14 and transmission scheme selection unit 11 (step S13).

Modulation unit 14 modulates the transmission data based on the modulation scheme information received from modulation scheme selection unit 10 for output as modulation data to multiplier 16A-multiplier 16D (step S14).

If the coding rate represented by the error correction control information received from error correction control unit 18 is less than ¾ (YES at step S115), transmission scheme selection unit 11 outputs a transmission weight generation instruction to MMSE transmission weight generation unit 13 (step S17).

Furthermore, even if the coding rate represented by the error correction control information received from error correction control unit 18 is equal to or more than ¾ (NO at step S15), when the number of levels of the modulation scheme represented by the modulation scheme information received from modulation scheme selection unit 10 is less than 8 (YES at step S16), transmission scheme selection unit 11 outputs a transmission weight generation instruction to MMSE transmission weight generation unit 13 (step S17).

On the other hand, if the coding rate represented by the error correction control information received from error correction control unit 18 is equal to or more than ¾ (NO at step S15), and when the number of levels of the modulation scheme represented by the modulation scheme information received from modulation scheme selection unit 10 is equal to or more than 8 (NO at step S16), a transmission weight generation instruction is output to in-phase combination transmission weight generation unit 12 (step S18).

Upon reception of the transmission weight generation instruction from transmission scheme selection unit 11, MMSE transmission weight generation unit 13 generates a transmission weight for each antenna by the aforementioned MMSE reception weight copy method for output to transmission weight setting unit 15, based on the reception weight for each antenna received from reception weight generation unit 6, which is a reception processing result from adaptive array reception processing unit 101 (step S19).

Upon reception of the transmission weight generation instruction from transmission scheme selection unit 11, in-phase combination transmission weight generation unit 12 generates a transmission weight for each antenna by the aforementioned in-phase combination maximum transmission method, based on the reception response vector received from reception response vector generation unit 9, for output to transmission weight setting unit 15 (step S19).

Transmission weight setting unit 15 outputs the transmission weight for each antenna received from in-phase combination transmission weight generation unit 12 or MMSE transmission weight generation unit 13 to multiplier 16A-multiplier 16D (step S20).

Multiplier 16A-multiplier 16D multiply the modulation data received from modulation unit 14 by the transmission weight for each antenna received from transmission weight setting unit 15 to generate array transmission data having transmission directivity based on MMSE reception weight copy method or the in-phase combination maximum transmission method for output to transmission unit 17A-transmission unit 17D (step S20).

Unfortunately, the radio apparatus disclosed in Japanese Patent Laying-Open No. 2004-153527 (Patent Document 4) and Japanese Patent Laying-Open No. 2003-298670 (Patent Document 5) cannot support both of the adaptive array processing and the adaptive modulation and select a transmission directivity control scheme properly according to a modulation scheme.

However, in the adaptive array base station in accordance with the present embodiment, if the coding rate is less than ¾, that is, if the error correction ability is high, irrespective of the selected modulation scheme, that is, even if 8PSK modulation scheme or 16QAM modulation scheme with low noise immunity is selected, MMSE reception weight copy method is selected which has the effect of suppressing the interfering radiation characteristic to other base stations (cells).

On the other hand, if the coding rate is equal to or more than ¾, that is, if the error correction ability is low, and when the number of levels is less than 8, that is, when the modulation scheme with high noise immunity is selected, MMSE reception weight copy method is selected which has the effect of suppressing the interfering radiation characteristic to other base stations (cells).

Furthermore, if the coding rate is equal to or more than ¾, that is, if the error correction ability is low, and when the number of levels is equal to or more than 8, that is, when the modulation scheme with low noise immunity is selected, the in-phase combination maximum transmission method is selected which has the effect of maximizing the reception power at a desired user terminal.

Therefore, the adaptive array base station in accordance with the present embodiment can support both of the adaptive array processing and the adaptive modulation and select a transmission directivity control scheme properly according to a modulation scheme. Moreover, the adaptive array base station in accordance with this embodiment can also select a transmission directivity control scheme properly according to a coding rate in the error correction coding process and a modulation scheme.

[Modification]

The present invention is not limited to the embodiments above and includes, for example, the following modifications.

(1) Transmission Directivity Control Scheme

The adaptive array base station in accordance with the embodiment of the present invention is configured to use the in-phase combination maximum transmission method and MMSE reception weight copy method. However, the present invention is not limited thereto.

The present invention is not limited to the in-phase combination maximum transmission method, and any method can be used as long as the method maximizes reception power at a desired user terminal.

Furthermore, the present invention is not limited to MMSE reception weight copy method, and any method can be used as long as the method generates a transmission weight to direct a beam of a transmission radio wave in the direction of a desired user terminal and direct a null of a transmission radio wave in the direction of an interfering user terminal. For example, MMSE transmission weight generation unit 13 generating a transmission weight by MMSE reception weight copy method can be replaced with a Zero-forcing transmission weight generation unit generating a transmission weight by the aforementioned Zero-forcing method. In this case, Zero-forcing transmission weight generation unit is configured to generate a transmission weight based on a reception response vector received from reception response vector generation unit 9 in place of a reception weight for each antenna received from reception weight generation unit 6.

(2) Applicable Apparatus

Although in the embodiments of the present invention, the description has been made to the case in which the present invention is applied to an adaptive array base station, the present invention is not limited to a base station and may be applicable to any other radio apparatus such as a mobile terminal apparatus performing the adaptive array processing.

(3) Error Correction Coding Scheme

Error correction coding unit 19 in the adaptive array base station in accordance with the second embodiment of the present invention is configured to generate a convolution code. However, the present invention is not limited thereto. Any error correction code may be used as long as the error correction code can vary the error correction ability.

Alternatively, error correction coding unit 19 is configured to perform error correction coding by a plurality of error correction coding schemes different in error correction ability. Then, error correction control unit 18 may be configured to select any one of a plurality of error correction coding schemes different in error correction ability, for example, according to the state of communication with a desired user terminal and the service type such as voice communication and data communication used by a desired user terminal.

(4) Criterion for Selecting Transmission Directivity Control Scheme

Transmission scheme selection unit 11 in the adaptive array base station in accordance with the second embodiment of the present invention is configured to select the in-phase combination maximum transmission method and MMSE reception weight copy method based on the coding rate of the error correction code and the modulation scheme. However, the present invention is not limited thereto. One of in-phase combination transmission weight generation unit 12 and MMSE transmission weight generation unit 13 may be selected only based on the coding rate represented by the error correction control information received from error correction control unit 18, so that a transmission weight generation instruction is output to the selected transmission weight generation unit.

More specifically, if the coding rate represented by the error correction control information received from error correction control unit 18 is less than ¾, transmission scheme selection unit 11 outputs a transmission weight generation instruction to MMSE transmission weight generation unit 13. On the other hand, if the coding rate represented by the error correction control information received from error correction control unit 18 is equal to or more than ¾, transmission scheme selection unit 11 outputs a transmission weight generation instruction to in-phase combination transmission weight generation unit 12.

Because of this configuration, the present invention can be applied to a radio apparatus that performs the adaptive array processing but does not perform the adaptive modulation.

It should be understood that the embodiments disclosed herein are illustrative rather than limitative in all aspects. The scope of the present invention is shown not in the foregoing description but in the claims, and all the equivalencies within the scope of the claims and all the modifications within the scope are intended to be embraced herein.

The invention claimed is:

1. A radio apparatus receiving and transmitting a signal using a plurality of antennas, comprising:
    an adaptive array reception processing unit performing a reception process on a reception signal received by said plurality of antennas by adaptive array processing;
    a reception response vector generation unit generating a reception response vector based on the reception signal received by said plurality of antennas;
    a modulation scheme selection unit selecting a modulation scheme;
    a modulation unit modulating transmission data;
    a transmission scheme selection unit selecting one of a first transmission weight for forming transmission directivity to direct a beam of a transmission radio wave in a direction of desired another radio apparatus and direct a null of a transmission radio wave in a direction of an interference wave and a second transmission weight for forming transmission directivity to maximize reception power at said desired another radio apparatus;
    a transmission weight generation unit generating said first transmission weight based on a reception process resulted from said adaptive array reception processing unit or said reception response vector if said first transmission weight is selected, and generating said second transmission weight based on said reception response vector if said second transmission weight is selected;
    a transmission weight processing unit generating array transmission data having said transmission directivity, based on said modulated transmission data and said generated transmission weight; and
    a transmission unit converting said array transmission data into a transmission signal, wherein
    said transmission scheme selection unit selects said first transmission weight if a number of levels of said selected modulation scheme is less than a prescribed value, and selects said second transmission weight if a number of levels of said selected modulation scheme is equal to or more than said prescribed value.

2. A radio apparatus receiving and transmitting a signal using a plurality of antennas, comprising:
    an adaptive array reception processing unit performing a reception process on a reception signal received by said plurality of antennas by adaptive array processing;
    a reception response vector generation unit generating a reception response vector based on the reception signal received by said plurality of antennas;
    a modulation scheme selection unit selecting a modulation scheme;
    a modulation unit modulating transmission data;
    a transmission scheme selection unit selecting one of a first transmission weight for forming transmission directivity to direct a beam of a transmission radio wave in a direction of desired another radio apparatus and direct a null of a transmission radio wave in a direction of an interference wave and a second transmission weight for forming transmission directivity to maximize reception power at said desired another radio apparatus;
    a transmission weight generation unit generating said first transmission weight based on a reception process resulted from said adaptive array reception processing unit or said reception response vector if said first transmission weight is selected, and generating said second transmission weight based on said reception response vector if said second transmission weight is selected;
    a transmission weight processing unit generating array transmission data having said transmission directivity, based on said modulated transmission data and said generated transmission weight;
    a transmission unit converting said array transmission data into a transmission signal; and
    an error correction coding unit performing an error correction coding process on said transmission data, wherein
    said modulation unit modulates the transmission data subjected to said error correction coding process,
    said transmission scheme selection unit selects one of said first transmission weight and said second transmission weight, based on a coding rate of said error correction coding process, and
    said transmission scheme selection unit selects said first transmission weight if said coding rate is less than a prescribed coding rate or if said coding rate is equal to or more than said prescribed coding rate and a number of levels of said selected modulation scheme is less than a prescribed number of levels, and selects said second transmission weight if said coding rate is equal to or more than said prescribed coding rate and if a number of levels of said selected modulation scheme is equal to or more than said prescribed number of levels.

3. A transmission control method in a radio apparatus receiving and transmitting a signal using a plurality of antennas, comprising:
    an adaptive array reception processing step of performing a reception process on a reception signal received by said plurality of antennas by adaptive array processing;
    a reception response vector generation step of generating a reception response vector based on the reception signal received by said plurality of antennas;
    a modulation scheme selection step of selecting a modulation scheme;
    a modulation step of modulating transmission data;
    a transmission scheme selection step of selecting one of a first transmission weight for forming transmission directivity to direct a beam of a transmission radio wave in a direction of desired another radio apparatus and direct a null of a transmission radio wave in a direction of an interference wave and a second transmission weight for forming transmission directivity to maximize reception power at said desired another radio apparatus;

a transmission weight generation step of generating said first transmission weight based on a reception process resulted at said adaptive array reception processing step or said reception response vector if said first transmission weight is selected, and generating said second transmission weight based on said reception response vector if said second transmission weight is selected; and a transmission weight processing step of generating array transmission data having said transmission directivity, based on said modulated transmission data and said generated transmission weight, wherein at said transmission scheme selection step, said first transmission weight is selected if a number of levels of said selected modulation scheme is less than a prescribed value, and said second transmission weight is selected if a number of levels of said selected modulation scheme is equal to or more than said prescribed value.

4. A transmission control method in a radio apparatus receiving and transmitting a signal using a plurality of antennas, comprising:

an adaptive array reception processing step of performing a reception process on a reception signal received by said plurality of antennas by adaptive array processing;

a reception response vector generation step of generating a reception response vector based on the reception signal received by said plurality of antennas;

a modulation scheme selection step of selecting a modulation scheme;

a modulation step of modulating transmission data;

a transmission scheme selection step of selecting one of a first transmission weight for forming transmission directivity to direct a beam of a transmission radio wave in a direction of desired another radio apparatus and direct a null of a transmission radio wave in a direction of an interference wave and a second transmission weight for forming transmission directivity to maximize reception power at said desired another radio apparatus;

a transmission weight generation step of generating said first transmission weight based on a reception process resulted at said adaptive array reception processing step or said reception response vector if said first transmission weight is selected, and generating said second transmission weight based on said reception response vector if said second transmission weight is selected;

a transmission weight processing step of generating array transmission data having said transmission directivity, based on said modulated transmission data and said generated transmission weight; and an error correction coding step of performing an error correction coding process on said transmission data, wherein at said modulation step, the transmission data subjected to said error correction coding process is modulated, at said transmission scheme selection step, one of said first transmission weight and said second transmission weight is selected based on a coding rate of said error correction coding process, and at said transmission scheme selection step, said first transmission weight is selected if said coding rate is less than a prescribed coding rate or if said coding rate is equal to or more than said prescribed coding rate and a number of levels of said selected modulation scheme is less than a prescribed number of levels, and said second transmission weight is selected if said coding rate is equal to or more than said prescribed coding rate and if a number of levels of said selected modulation scheme is equal to or more than said prescribed number of levels.

* * * * *